United States Patent
Kim et al.

(10) Patent No.: US 9,081,435 B2
(45) Date of Patent: Jul. 14, 2015

(54) DISPLAY APPARATUS

(75) Inventors: HeeJoon Kim, Asan-si (KR); Jae-Ho Oh, Seoul (KR); Jaehyun Cho, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 392 days.

(21) Appl. No.: 13/290,560

(22) Filed: Nov. 7, 2011

(65) Prior Publication Data

US 2012/0262384 A1    Oct. 18, 2012

(30) Foreign Application Priority Data

Apr. 18, 2011    (KR) .................. 10-2011-0035815

(51) Int. Cl.
*G06F 3/041*    (2006.01)
*G06F 3/042*    (2006.01)

(52) U.S. Cl.
CPC .............. *G06F 3/0412* (2013.01); *G06F 3/042* (2013.01); *G06F 3/0418* (2013.01)

(58) Field of Classification Search
USPC .................................................... 345/173, 98
See application file for complete search history.

(56) References Cited

U.S. PATENT DOCUMENTS

| 4,913,547 A * | 4/1990 | Moran .......................... 356/489 |
| 5,758,264 A * | 5/1998 | Bonta et al. .................. 455/67.7 |
| 2004/0066363 A1* | 4/2004 | Yamano et al. ................ 345/98 |
| 2006/0227628 A1 | 10/2006 | Eriguchi et al. |

FOREIGN PATENT DOCUMENTS

| JP | 2006-267525 | 10/2006 |
| KR | 10-2005-0107092 | 11/2005 |
| KR | 10-2006-0103082 | 9/2006 |
| KR | 10-2007-0069238 | 7/2007 |
| KR | 10-2010-0007555 | 1/2010 |

* cited by examiner

*Primary Examiner* — Fred Tzeng
(74) *Attorney, Agent, or Firm* — H.C. Park & Associates, PLC

(57) ABSTRACT

In a display apparatus, one frame includes a first sub-frame in which a previous image is held and a second sub-frame in which a present image is displayed. A plurality of sensors recognizes an object disposed on a display panel and sequentially outputs sensing signals in response to scan signals. Sensing signals are divided into a first sensing signal read out during a first sub-frame and a second sensing signal read out during a second sub-frame, and a control circuit generates a noise free signal using the first and second sensing signals. Thus, a coordinate value indicating the position of the object may be generated based on the noise free signal, thereby preventing mis-operation or malfunction caused by the noise.

23 Claims, 12 Drawing Sheets

DISPLAY APPARATUS

CROSS-REFERENCE TO RELATED APPLICATION

This application claims priority to and the benefit of Korean Patent Application No. 10-2011-0035815, filed on Apr. 18, 2011, which is incorporated by reference for all purposes as if fully set forth herein.

BACKGROUND

1. Field of the Invention

The present invention relates to a display apparatus. More particularly, the present invention relates to a display apparatus including a display panel with an embedded sensor.

2. Description of the Background

Recently, a touch panel of a display apparatus has been extensively adopted since a separate input device of the image display apparatus, such as a keyboard and a mouse which are attached to the image display apparatus, is no longer required for users to operate display apparatus.

Traditionally, a separate touch panel has been used in addition to a display panel in a display apparatus. In this case, the touch panel is disposed on a display panel to detect information corresponding to inputs from the users. However, when the touch panel is provided separately from the display panel, optical characteristics of the display, such as brightness, visibility and viewing angle of the display panel are deteriorated and the whole thickness of the liquid crystal display is undesirably increased due to the thickness of the touch panel.

Therefore, there is a need to provide sensor embedded display panel capable of generating a noise free signal.

SUMMARY

These and other needs are addressed by the present invention, in which exemplary embodiments of the present invention provide a display apparatus capable of preventing misoperation or malfunction due to a distortion of a sensing signal output from a sensor embedded in a display panel.

Exemplary embodiments of the present invention disclose a display panel. The display panel includes a plurality of pixels to display frames and sub frames. The frames include a previous frame, a present frame and a next frame. And the sub frames comprising a first sub frame and a second sub frame. The display includes the pixels that receive data voltages of the previous frame during the first sub-frame of the present frame to hold a previous image and to receive data voltages of the present frame during the second sub-frame of the present frame to display a present image. The display panel includes a plurality of sensors configured to detect touch event on the display panel and to output sensing signals. The display panel also includes a scan driver including a plurality of stages to output a plurality of scan signals to switch the sensors. The scan driver is configured to drive a first scan block among the output stages during the first sub-frame and to drive a second scan block among the output stages during the second sub-frame. The display panel includes a readout circuit configured to read out the output sensing signals. And a control circuit is configured to generate a noise free signal using a first sensing signal read out during the first sub-frame and a second sensing signal read out during the second sub-frame and to generate a coordinate value to indicate the position of the object on the display panel based on the noise free signal.

Exemplary embodiments of the present invention disclose an apparatus. The apparatus includes a panel including a pixel to display a frame which comprises a first sub frame to hold previous frame and a second sub frame to display current frame. The apparatus includes a sensor which is configured to sequentially output a series of sensing signals in response to detection of an object. The apparatus includes a controller configured to generate a noise free signal using a first sensing signal read out during the first sub-frame and a second sensing signal read out during the second sub-frame.

Exemplary embodiments of the present invention disclose a method. The method comprises arranging a plurality of pixels to display a frame comprising a first sub frame to hold previous frame and a second sub frame to display current frame. The method also comprises generating a noise free signal using a first sensing signal read out during the first sub-frame and a second sensing signal read out during the second sub-frame, wherein a plurality of sensors are arranged to sequentially output a series of sensing signals in response to detection of an object It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION

A display panel apparatus and method of manufacturing a display panel apparatus are disclosed. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although numerical terms such as first second and third may be used herein to describe various elements, components, regions, layers and/or sections, these elements, components, regions, layers and/or sections should not be limited by these numerical terms. These terms are merely used to specify a sequence order of an element, a component, a region, a layer or a section from another region, layer or section.

Spatially relative terms, such as "beneath", "below", "lower", "above", "upper" and the like, may be used herein for illustration of elements or spatial relationship with respect to one element or feature's relationship to another element(s) or feature(s) as illustrated in the figures. It will be understood that the spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative terms used herein may be interpreted accordingly.

The terminology used herein is for the purpose of describing particular embodiments only and is not intended to be limiting of the invention. As used herein, the singular forms, "a", "an" and "the" may include the plural forms as well, unless the context clearly indicates otherwise.

Hereinafter, exemplary embodiments of the present invention will be explained in detail with reference to the accompanying drawings.

Figure 1:
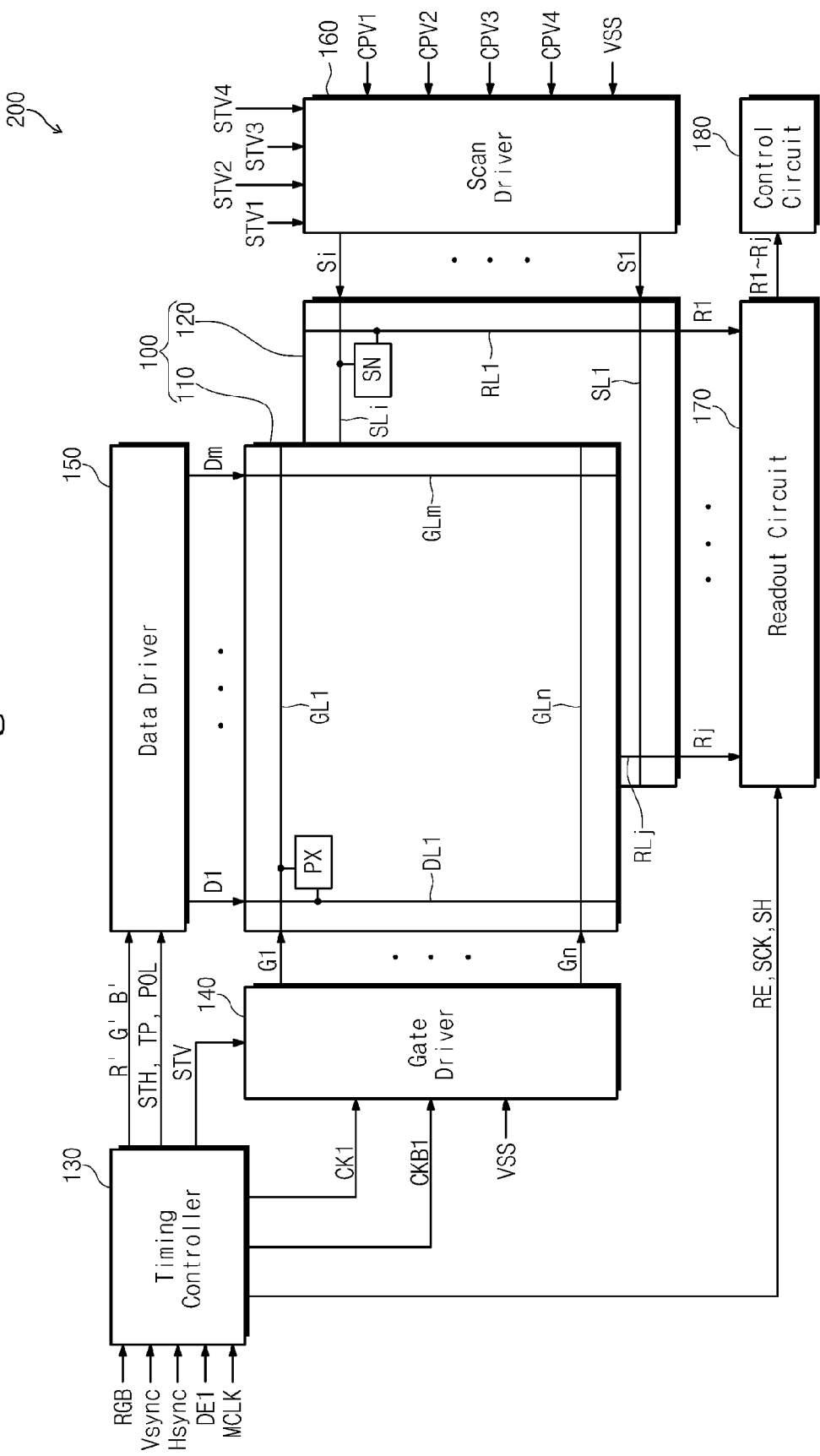
FIG. 1 is a block diagram showing a display apparatus according to exemplary embodiments of the present invention.
Figure 2:
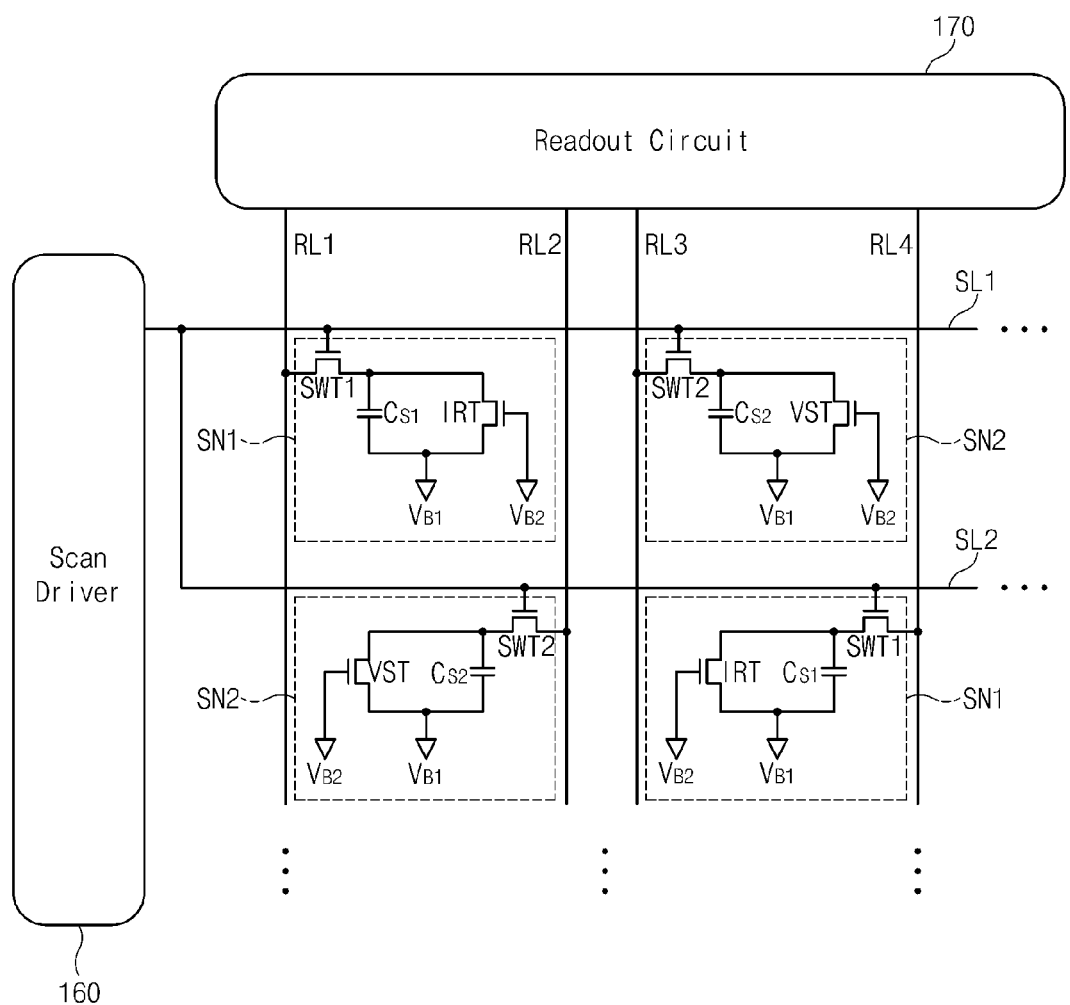
FIG. 2 is a circuit diagram showing a plurality of sensors shown in FIG. 1.

FIG. 1 is a block diagram showing a display apparatus according to exemplary embodiments of the present invention, and FIG. 2 is a circuit diagram showing a plurality of sensors shown in FIG. 1.

Referring to FIG. 1, a display apparatus 200 includes a display panel 100, a timing controller 130, a gate driver 140, a data driver 150, a scan driver 160, a readout circuit 170, and a control circuit 180.

The timing controller 130 receives a plurality of image signals RGB and a plurality of control signals, such as a vertical synchronization signal Vsync, a horizontal synchronization signal Hsync, a main clock signal MCLK, and a first data enable signal DEN1, from an external source of the display apparatus 200. The timing controller 130 converts a data format of the image signals RGB into a data format appropriate to an interface between the data driver 150 and the timing controller 130, and provides the converted image signals R'G'B' to the data driver 150. In addition, the timing controller 130 applies data control signals, such as an output start signal TP, a horizontal start signal STH, and a polarity inversion signal POL to the data driver 150, and applies gate control signals, such as a vertical start signal STV, a first gate clock signal CK1, a second gate clock signal CKB1 to the gate driver 140.

The gate driver 140 sequentially outputs gate signals G1 to Gn in response to the gate control signals STV1, CK1, and CKB1 provided from the timing controller 130.

The data driver 150 converts the image signals R'G'B' into data voltages D1 to Dm in response to the data control signals TP, STH, and POL provided from the timing controller 130. The data voltages D1 to Dm are applied to the display panel 100.

For example, the display panel 100 may include a first substrate 110, a second substrate 120 facing the first substrate 110, and a liquid crystal layer (not shown) may be disposed between the first substrate 110 and the second substrate 120. The first substrate 110 includes a plurality of pixels PX and the second substrate 120 includes a plurality of sensors SN.

To better understanding of exemplary embodiments, since the pixels PX have the same structure and function, one pixel will be exemplary described in detail as a representative example.

According to the exemplary embodiments, the first substrate 110 may include a plurality of gate lines GL1 to GLn, a plurality of data lines DL1 to DLm crossing the gate lines GL1 to GLn, and a plurality of pixels PX. Each of the pixels PX may include a thin film transistor (not shown) and a pixel electrode (not shown). The thin film transistor may include a gate electrode connected to a corresponding gate line of the gate lines GL1 to GLn, a source electrode connected to a corresponding data line of the data lines DL1 to DLm, and a drain electrode connected to the pixel electrode.

The gate lines GL1 to GLn are connected to the gate driver 140 and the data lines DL1 to DLm are connected to the data driver 150. The gate lines GL1 to GLn receive the gate signals G1 to Gn applied from the gate driver 140 and the data lines DL1 to DLm receive the data voltages D1 to Dm applied from the data driver 150.

Accordingly, the thin film transistor in each pixel PX is turned on in response to the gate signal applied through the corresponding gate line so that the data voltage applied through the corresponding data line is applied to the pixel electrode through the turned-on thin film transistor.

The second substrate may 120 further include a reference electrode facing the pixel electrode while interposing the liquid crystal layer between the pixel electrode and the reference electrode.

In addition, the second substrate 120 may further include a plurality of scan lines SL1 to SLi and a plurality of readout lines RL1 to RLj crossing the scan lines SL1 to SLi.

For the convenience of explanation, first scan line SL1 and second scan line SL2 among the scan lines SL1 to SLi and first readout line RL1, second readout line RL2, third readout line RL3, and fourth readout line RL4 among the readout lines RL1 to RLj have been shown in FIG. 2.

Referring to FIG. 2, the sensors SN may include at least two kinds of sensors. For example, the sensors SN may include a plurality of first sensors SN1 to detect an infrared ray and a plurality of second sensors SN2 to detect a visible ray.

For example, each of the first sensors SN1 may include a first switching transistor SWT1, a first sensor transistor IRT, and a first capacitor $C_{S1}$. The first switching transistor SWT1 may include a gate electrode connected to a corresponding scan line of the scan lines SL1 to SLi, a source electrode connected to a corresponding readout line of the readout lines RL1 to RLj, and a drain electrode connected to the first capacitor $C_{S1}$ and the first sensor transistor IRT.

The first capacitor $C_{S1}$ may include a first electrode connected to the drain electrode of the first switching transistor SWT1 and a second electrode applied with a first bias voltage $V_{B1}$. For example, the first bias voltage $V_{B1}$ may be about −8.75 volts.

The first sensor transistor IRT may include a gate electrode applied with a second bias voltage $V_{B2}$, a source electrode connected to the drain electrode of the first switching transistor SWT1, and a drain electrode applied with the first bias voltage $V_{B1}$. The second bias voltage $V_{B2}$ has a voltage level lower than that of the first bias voltage $V_{B1}$. For example, the second bias voltage $V_{B2}$ may be about −13.75 volts.

The first sensor transistor IRT generates a photocurrent corresponding to a light amount of the infrared ray incident from the external source. The structure needed to supply the infrared ray to the first sensor transistor IRT will be described in detail with reference to FIG. 8.

The voltage charged in the first capacitor $C_{S1}$ is discharged by the photocurrent generated by the first sensor transistor IRT. For example, as the amount of the infrared ray incident to the first sensor transistor IRT increases, the amount of discharge from the first capacitor $C_S1$ increases.

The readout circuit 170 recognizes an electron charge amount needed to charge the first capacitor $C_{S1}$ by the turn-on of the first switching transistor SWT1, thereby detecting the amount of the infrared ray incident to each of the first sensors SN1.

Meanwhile, each of the second sensors SN2 may include a second switching transistor SWT2, a second sensor transistor VST, and a second capacitor $C_{S2}$. The second switching transistor SWT2 may include a gate electrode connected to a corresponding scan line of the scan lines SL1 to SLi, a source electrode connected to a corresponding readout line of the readout lines RL1 to RLj, and a drain electrode connected to the second capacitor $C_{S2}$ and the second sensor transistor VST.

The second capacitor $C_{S2}$ may include a first electrode connected to the drain electrode of the second switching transistor SWT2 and a second electrode applied with the first bias voltage $V_{B1}$.

The second sensor transistor VST may include a gate electrode applied with the second bias voltage $V_{B2}$, a source electrode connected to the drain electrode of the second switching transistor SWT2, and a drain electrode applied with the first bias voltage $V_{B1}$. The second bias voltage $V_{B2}$ has the voltage level lower than that of the first bias voltage $V_{B1}$.

The second sensor SN2 is operated the same as the first sensor SN1 except that the second sensor SN2 detects the visible ray incident from the external source. Accordingly, the detailed description of the second sensor SN2 will be omitted to avoid unnecessarily obscuring the present invention.

The scan lines SL1 to SLi are connected to the scan driver 160 to sequentially receive scan signals S1 to Si. The scan driver 160 receives scan control signals (i.e., first start signal STV1, second start signal STV2, third start signal STV 3, and fourth start signal STV4, and first scan clock signal CPV1, second scan clock signal CPV2, third scan clock signal CPV3 and fourth scan clock signal CPV4) from the timing controller 130 and sequentially outputs the scan signals S1 to Si. The scan control signals STV1 to STV4 and CPV1 to CPV4 may be synchronized with the gate control signals STV1, CK1, and CKB1.

The readout lines RL1 to RLj are connected to the readout circuit 170 to apply signals detected by corresponding first sensor SN1 and second sensor SN2 to the readout circuit 170.

As shown in FIG. 2, the first sensor SN1 and the second sensor SN2 are alternately arranged with each other in a row direction in which the scan lines SL1 to SLi are extended and alternately arranged with each other in a column direction in which the readout lines RL1 to RLj are extended.

As an example, a (4k−3)th readout line (i.e., the first readout line RL1 in FIG. 2) and a 4k-th readout line (i.e., the fourth readout line RL4 in FIG. 2) among the readout lines RL1 to RLj are connected to the first sensors SN1. In this example, the "k" is a natural number equal to or larger than 1. In addition, among the readout lines RL1 to RLj, a (4k−2)th readout line (i.e., the second readout line RL2 in FIG. 2) and a (4k−1)th readout line (i.e., the third readout line RL3 in FIG. 2) are connected to the second sensors SN2.

In each of the first sensor SN1 and the second sensor SN2, when the first switching transistor SWT1 and the second switching transistor SWT2 are turned on in response to the scan signals applied through the corresponding scan lines, the variation of the voltage charged in the first capacitor CS1 and the second capacitors CS2 is applied to the corresponding readout line through the turned-on switching transistors SWT1 and SWT2.

The readout circuit 170 charges the sensing signals R1 to Rj from the readout lines RL1 to RLj in response to the control signals (i.e., a reset signal RE, a sensing clock signal SCK, and a sampling signal SH) from the timing controller 130 and sequentially applies the charged sensing signals to the control circuit 180 at a predetermined time point.

The control circuit 180 generates two-dimensional coordinate value indicating a position of an object disposed on the display panel 100 based on the time point at which the scan signals S1 to Si are generated and the sensing signals R1 to Rj.

When the two-dimensional coordinate value is generated, the control circuit 180 may perform a noise removal process to remove noises included in the sensing signals R1 to Rj. The noise removal process will be described in detail later.

Figure 3:
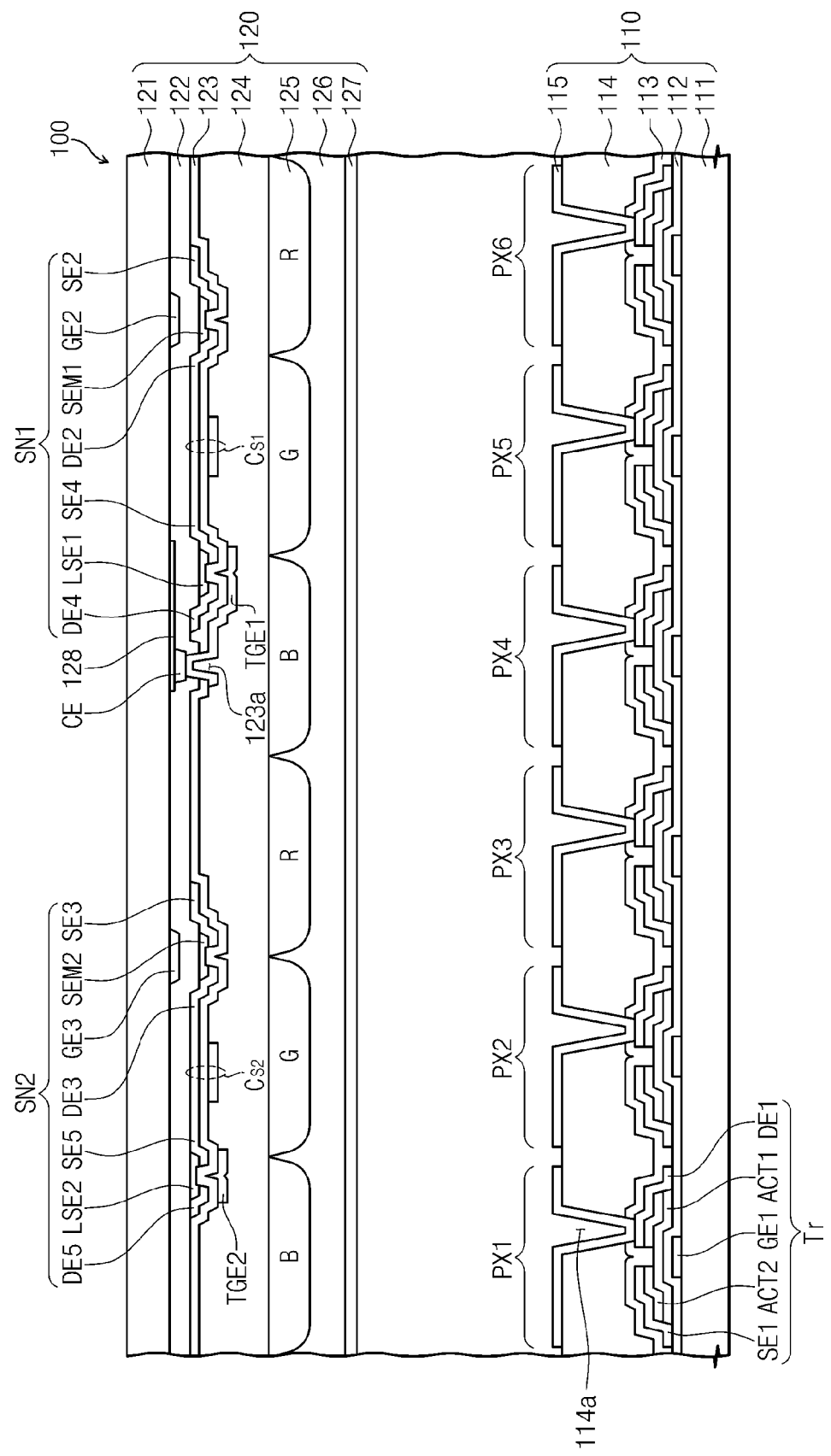
FIG. 3 is a cross-sectional view showing a display panel shown in FIG. 1.

FIG. 3 is a cross-sectional view showing a display panel shown in FIG. 1.

Referring to FIG. 3, the display panel 100 may include the first substrate 110, the second substrate 120 facing the first substrate 110, and the liquid crystal layer 129 may be disposed between the first substrate 110 and the second substrate 120.

The first substrate 110 may include a first base substrate 111 and a plurality of pixels PX disposed on the first base substrate 111. FIG. 3 shows six pixels PX1 to PX6. The pixels PX1 to PX6 have the same structure and function, and thus one pixel will be described in detail and details of others will be omitted to avoid unnecessarily obscuring the present invention.

Each of the pixels PX1 to PX6 may include the thin film transistor Tr and the pixel electrode 115. For example, the gate electrode GE1 of the thin film transistor Tr is formed on the first base substrate 111. The gate electrode GE1 is covered by a first gate insulating layer 112.

For example, an active layer ACT1 and an ohmic contact layer ACT2 are formed on the first gate insulating layer 112 to face the gate electrode GE1. Then, the source electrode SE1 and the drain electrode DE1 are formed on the active layer ACT1 to be spaced apart from each other by a predetermined distance. The source electrode SE1 and the drain electrode DE1 are covered by a first protection layer 113 and a first organic insulating layer 114 is further formed on the first protection layer 113.

The first protection layer 113 and the first organic insulating layer 114 are provided with a contact hole 114a formed therethrough to expose the drain electrode DE1. The pixel electrode 115 is formed on the first organic insulating layer 114 and electrically connected to the drain electrode DE1 through the contact hole 114a.

For example, the second substrate 120 may include a second base substrate 121, the first and second sensors SN1 and SN2 formed on the second base substrate 121, a color filter layer 125 including a plurality of color pixels R, G, and B corresponding to the pixels PX, respectively, and the reference electrode 127.

The first sensor SN1 may include the first switching transistor SWT, the first capacitor $C_{S1}$, and the first sensor transistor IRT. The second sensor SN2 may include the second switching transistor SWT2, the second capacitor $C_{S2}$, and the second sensor transistor VST.

Since the first sensor SN1 and the second sensor SN2 have the similar structure, the first sensor SN1 and the second sensor SN2 may be substantially simultaneously formed by the same process.

In detail, the gate electrodes GE2 and GE3 of the first switching transistor SWT1 and the second switching transistor SWT2 are formed on the second base substrate 121.

The gate electrodes GE2 and GE3 of the first switching transistor SWT1 and the second switching transistor SWT2 are covered by a second gate insulating layer 122. A semiconductor layer SEMI of the first switching transistor SWT1 and a semiconductor layer SEM2 of the second switching transistor SWT2 are formed on the second gate insulating layer 122. The semiconductor layers SEM1 and SEM2 may include amorphous silicon layer.

In addition, a first light sensing layer LSE1 of the first sensor transistor IRT and a second light sensing layer LSE2 of the second sensor transistor VST are formed on the second insulating layer 122. The first light sensing layer LSE1 may be formed of silicon germanium (SiGe) reacting with the infrared ray and the second light sensing layer LSE2 may be formed of amorphous silicon (a-Si) reacting with the visible ray.

The second substrate 120 may further include an infrared ray filter 128 to block the visible ray and transmit the infrared ray. The infrared ray filter 128 may be disposed between the second base substrate 121 and the second gate insulating layer 122 to correspond to the first light sensing layer LSE1. As an example, the infrared ray filter 128 may be formed of silicon germanium (SiGe).

Source electrode SE2 and drain electrode DE2 are formed on the semiconductor layer SEM1 of the first switching transistor SWT1 to be spaced apart from each other, and the source electrode SE3 and the drain electrode DE3 are formed on the semiconductor layer SEM2 of the second switching transistor SWT2 to be spaced apart from each other. Thus, the first switching transistor SWT1 and the second switching transistor SWT2 may be completed.

In addition, source electrode SE4 and drain electrode DE4 are formed on the first light sensing layer LSE1 of the first sensor transistor IRT to be spaced apart from each other, and source electrode SE5 and drain electrode DE5 are formed on the second light sensing layer LSE2 of the second sensor transistor VST to be spaced apart from each other.

In the present exemplary embodiments, the source electrode SE4 of the first sensor transistor IRT may be electrically connected to the drain electrode DE2 of the first switching transistor SWT1 and may be used as the first electrode of the first capacitor $C_{S1}$.

In addition, the source electrode SE5 of the second sensor transistor VST may be electrically connected to the drain electrode DE3 of the second switching transistor SWT2 and the source electrode SE5 of the second sensor transistor VST may be used as the first electrode of the second capacitor $C_{S2}$.

The source electrode SE2 and the drain electrode DE2 of the first switching transistor SWT1, the source electrode SE3 and the drain electrode DE3 of the second switching transistor SWT2, the source electrode SE4 and the drain electrode DE4 of the first sensor transistor IRT, and the source electrode SE5 and the drain electrode DE5 of the second sensor transistor VST are covered by a second protection layer 123.

For example, the gate electrode (hereinafter, referred to as a first top gate) of the first sensor transistor IRT and the gate electrode (hereinafter, referred to as a second top gate) of the second sensor transistor VST are formed on the second protection layer 123.

In addition, the second electrode of the first capacitor $C_{S1}$ and the second electrode of the second capacitor $C_{S2}$ are formed on the second protection layer 123.

In addition, as shown in FIG. 3, the first top gate TGE1 of the first sensor transistor IRT may be electrically connected to the infrared ray filter 128. For example, a connection electrode CE may be disposed on the infrared ray filter 128 by the same process as the gate electrode GE2 of the first switching transistor SWT1. The second gate insulating layer 122 and the second protection layer 123 are provided with a second contact hole 123a to expose the connection electrode CE, and the first top gate TGE1 may be electrically connected to the connection electrode CE through the second contact hole 123a.

The first top gate TGE1 and the second top gate TGE2 of the first sensor transistor IRT and the second sensor transistor VST may be covered by a second organic insulating layer 124. The color filter layer 125 is formed on the second organic layer 124. The color filter layer 125 may include red, green, and blue color pixels R, G, and B, and each of the color pixels R, G, and B corresponds to one pixel.

For example, an overcoating layer 126 is formed on the color filter layer 125. The reference electrode 127 is formed on the overcoating layer 126. The reference electrode 127 is applied with the reference voltage. The reference voltage may be a direct-current voltage and the data voltages D1 to Dm may have a polarity with respect to the reference voltage.

However, when the data voltages D1 to Dm are applied to the pixels PX1 to PX6 in one polarity of a positive (+) polarity or a negative (−) polarity with respect to the reference voltage, the liquid crystal layer 129 may be deteriorated. Thus, the data driver 150 may convert the polarity of the data voltages D1 to Dm with respect to the reference voltage at every one frame in response to the polarity inversion signal POL.

Figure 4:
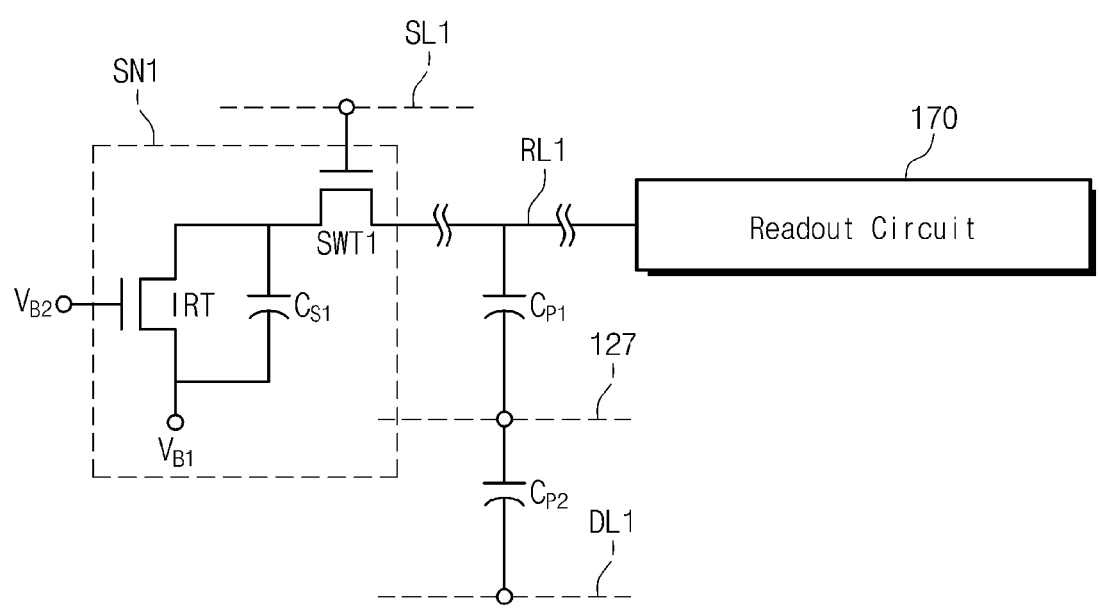
FIG. 4 is a circuit diagram showing a parasitic capacitor connected to a first sensor shown in FIG. 2.

FIG. 4 is a circuit diagram showing a parasitic capacitor connected to a first sensor shown in FIG. 2. FIG. 4 shows the parasitic capacitor connected to the first readout line RL1, but the parasitic capacitor may be formed at each of the readout lines RL1 to RLj disposed on the second substrate 120.

Referring to FIG. 4, the first sensor SN1 is electrically connected to the readout circuit 170 through the first readout line RL1. As shown in FIG. 2 and FIG. 3, the first sensor SN1 and the first readout line RL1 are disposed on the second substrate 120 of the display panel 100.

The reference electrode 127 is disposed on the second substrate 10. Accordingly, a first parasitic capacitor Cp1 is formed between the first readout line RL1 and the reference electrode 127.

For example, the reference electrode 127 faces the first data line DL1 disposed on the first substrate 110. FIG. 4 shows the reference electrode 127 facing the first data line DL1 as an example, but the reference electrode 127 may face each of the data lines DL1 to DLm disposed on the first substrate 110. Thus, a second parasitic capacitor Cp2 is formed between the reference electrode 127 and the first data line DL1.

The polarity of the first data voltage D1 applied to the first data line DL1 is swung every one frame with respect to the reference voltage applied to the reference voltage applied to the reference electrode 127. The reference voltage may be distorted at the time point at which the polarity of the first data voltage D1 is changed. The distortion of the reference voltage may have affect on the sensing signal read out through the first readout line RL1.

Hereinafter, a method of removing the noises included in the sensing signals R1, which is caused by the distortion of the reference voltage, will be described.

Figure 5:
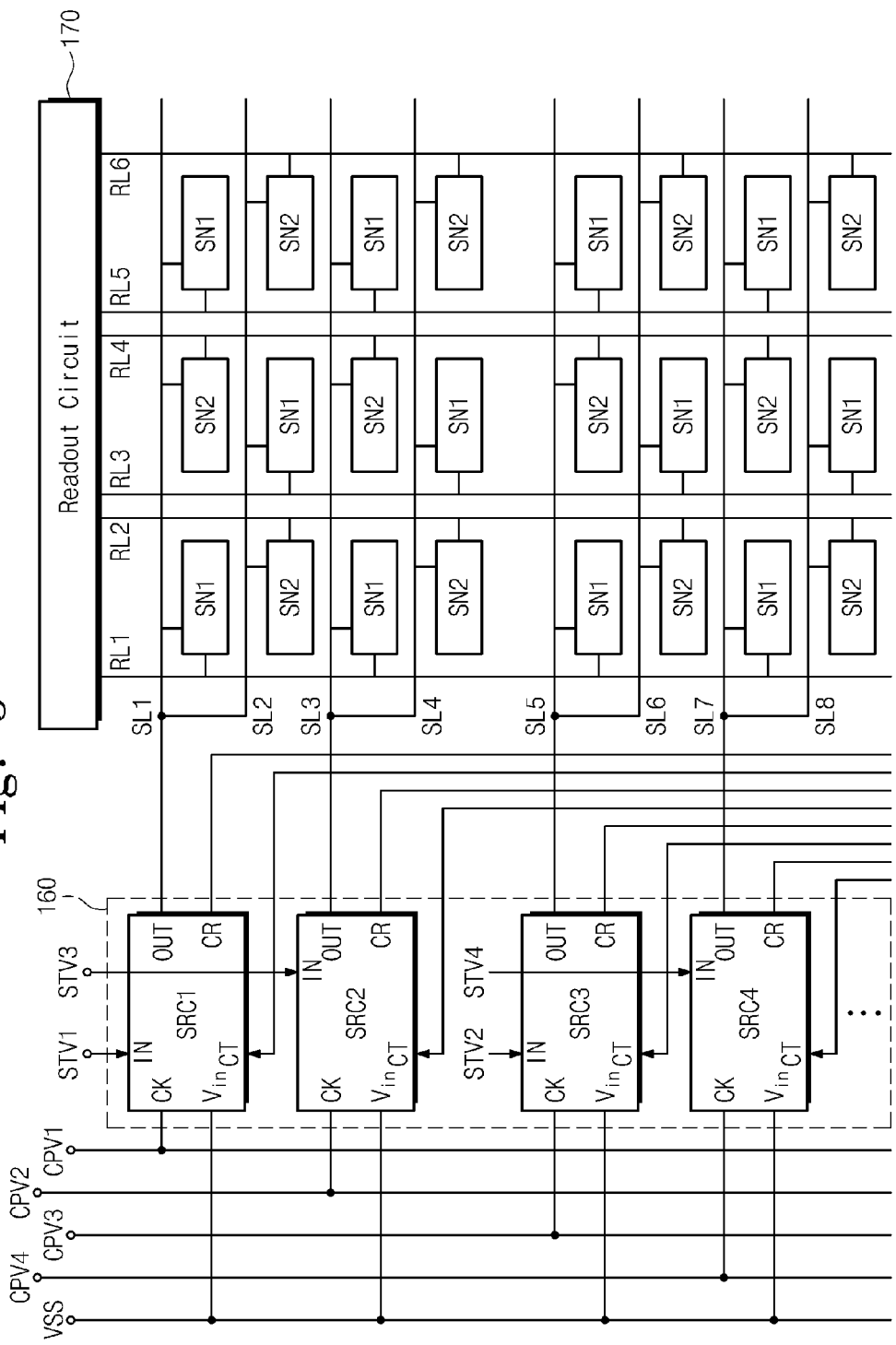
FIG. 5 is a block diagram showing a scan driver shown in FIG. 1.
Figure 6:
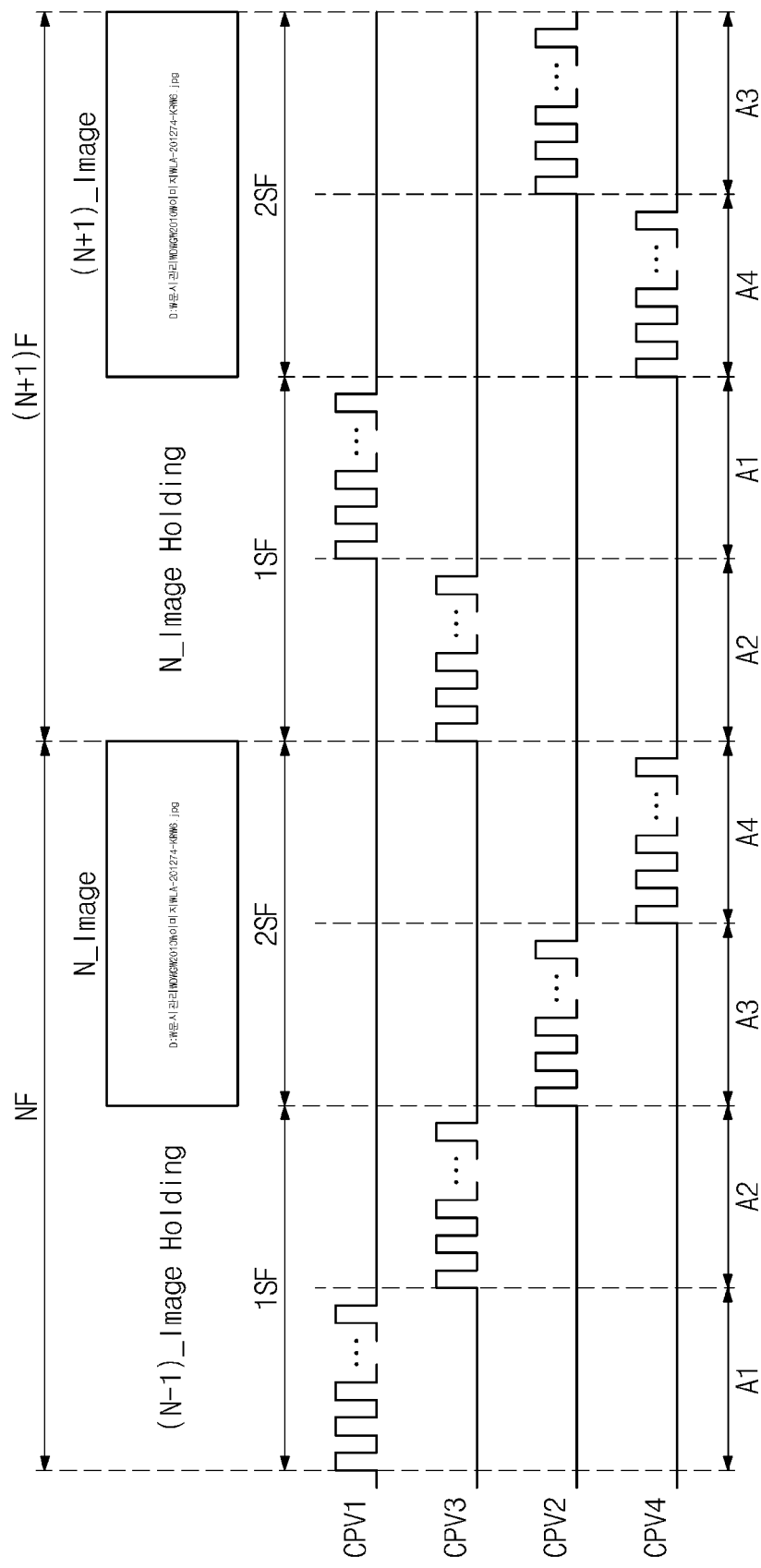
FIG. 6 is a waveform diagram showing first start signal to fourth start signal and first scan clock signal to fourth scan clock signal applied to the scan driver shown in FIG. 5.

FIG. 5 is a block diagram showing the scan driver shown in FIG. 1 and FIG. 6 is a waveform diagram showing first to fourth start signals and first to fourth scan clock signals applied to the scan driver shown in FIG. 5.

Referring to FIG. 5, for example, the scan driver 160 may include a plurality of stages SRC1, SRC2, SRC3, and SRC4 connected to the scan lines SL1 to SL8. Each of the stages SRC1, SRC2, SRC3, and SRC4 may be electrically connected to at least two scan lines. In addition, the stages SRC1, SRC2, SRC3, and SRC4 may be divided into two scan groups (hereinafter, referred to as first and second scan groups) that may be operated separately.

As shown in FIG. 6, for example, the display panel 100 (shown in FIG. 1) receives the data voltage of an (N−1)th frame during a first sub-frame 1SF within an N-th frame NF to hold an (N−1)th image N−1_Image and receives the data voltage of the N-th frame NF during a second sub-frame 2SF within the N-th frame NF to display an N-th image N_Image.

Then, the display panel 100 receives the data voltage of the N-th frame during a first sub-frame 1SF within an (N+1)th frame (N+1)F to hold the N-th image N_Image and receives the data voltage of the (N+1)th frame (N+1)F during a second sub-frame 2SF within the (N+1)th frame (N+1)F to display an (N+1)th image (N+1)_Image.

Meanwhile, the first scan group is operated during the first sub-frame 1SF to drive a portion of the scan lines SL1 to SLi, and the second scan group is operated during the second sub-frame 2SF to drive a remaining portion of the scan lines SL1 to SLi.

For example, the first scan group may include a first sub-scan block operated during a first period A1 of the first sub-frame 1SF and a second sub-scan block operated during a second period A2 of the first sub-frame 1SF. In addition, the second scan group may include a third sub-scan block operated during a third period A3 of the second sub-frame 2SF and a fourth sub-scan block operated during a fourth period A4 of the second sub-frame 2SF.

According to exemplary embodiments, in the case that the scan driver 160 includes p (p is a natural number equal to or larger than 1) stages, the first sub-scan block includes (4p−3)th stages (i.e., SRC1), the second sub-scan block includes (4p−1)th stages (i.e., SRC3), the third sub-scan block includes (4p−2)th stages (i.e., SRC2), and the fourth sub-scan block includes 4p-th stages (i.e., SRC4).

Meanwhile, the driving order of the first sub-scan block, the second sub-scan block, the third sub-scan block and the fourth sub-scan block may be varied at every one frame.

For example, the first period A1, during which the first sub-scan block is operated, in the first sub-frame 1SF of the N-th frame NF is generated prior to the second period A2 during which the second sub-scan block is operated. In addition, the third period A3, during which the third sub-scan block is operated, in the second sub-frame 2SF of the N-th frame NF is generated prior to the fourth period A4 during which the fourth sub-scan block is operated.

When the frame is changed, the second period A2, during which the second sub-scan block is operated, in the first sub-frame 1SF of the (N+1)th frame (N+1)F is generated prior to the first period A1 during which the first sub-scan block is operated. In addition, the fourth period A4, during which the fourth sub-scan block is operated, in the second sub-frame 2SF of the (N+1)th frame (N+1)F is generated prior to the third period A3 during which the third sub-scan block is operated.

The scan driver 160 receives the first start signal STV1, the second start signal STV2, the third start signal STV3 and the fourth start signal STV4 and the first scan clock signal CPV1, the second scan clock signal CPV2, the third scan clock signal CPV3 and the fourth scan clock signal CPV4 in order to control the driving order of each of the sub-scan block.

For example, each of the stages SRC1, SRC2, SRC3, and SRC4 mau include an input terminal IN, a clock terminal CK, a control terminal CT, a voltage input terminal Vin, an output terminal OUT, and a carry terminal CR.

Among the stages SRC1, SRC2, SRC3, and SRC4, the stages included in the first sub-scan block, that is, the (4p−3)th stages SRC1 receive the first scan clock signal CPV1 through the clock terminal CK, and the stages included in the second sub-scan block, that is, the (4p−1)th stages SRC3 receive the third scan clock signal CPV3 through the clock terminal CK. In addition, among the stages SRC1, SRC2, SRC3, and SRC4, the stages includes in the third sub-scan block, that is, the (4p−2)th stages SRC2 receives the second scan clock signal CPV2 through the clock terminal CK, and the stages includes in the fourth sub-scan block, that is, the 4p-th stages SRC4 receive the fourth scan clock signal CPV4 through the clock terminal.

The first scan clock signal CPV1, the second scan clock signal CPV2, the third scan clock signal CPV3 and the fourth scan clock signal CPV4 are generated in the order of the first scan clock signal CPV1, the third scan clock signal CPV3, the second scan clock signals CPV2, and the fourth scan clock signal CPV4 during the N-th frame NF, and the first scan clock signal CPV1, the second scan clock signal CPV2, the third scan clock signal CPV3 and the fourth scan clock signal CPV4 are generated in the order of the third clock signals CPV3, the first clock signal CPV1, the fourth clock signal CPV4, and the second scan clock signal CPV2 during the (N+1)th frame (N+1)F.

The first stage SRC1 of the (4p−3)th stages receives the first start signal STV1 through the input terminal IN thereof, the first stage SRC3 of the (4p−1)th stages receives the second start signal STV2 through the input terminal IN thereof, the first stage SRC2 of the (4p−2)th stages receives the third start signal STV3 through the input terminal IN thereof, and the first stage SRC4 of the 4p-th stages receives the fourth start signal STV4 through the input terminal IN thereof.

The first start signal STV1, the second start signal STV2, the third start signal STV3 and the fourth start signal STV4 are generated in the order of the first start signal STV1, the second start signal STV2, the third start signal STV3, and the fourth start signal STV4 in the N-th frame NF, and the first start signal STV1, the second start signal STV2, the third start signal STV3 and the fourth start signal STV4 are generated in the order of the second start signal STV2, the first start signal STV1, the fourth start signal STV4, and the third start signal STV3 in the (N+1)th frame (N+1)F.

For example, each of the (4p−3)th stages (i.e., SRC1) is connected to (8p−7)th and (8p−6)th scan lines (i.e., first and second scan lines SL1 and SL2) among the scan lines SL1 to SLi through the output terminal OUT thereof. Each of the (4p−1)th stages (i.e., SRC3) is connected to (8p−3)th and (8p−2)th scan lines (i.e., fifth and sixth scan lines SL5 and SL6) among the scan lines SL1 to SLi through the output terminal OUT thereof.

In addition, for example, each of the (4p−2)th stages (i.e., SRC2) is connected to (8p−5)th and (8p−4)th scan lines (i.e., third and fourth scan lines SL3 and SL4) among the scan lines SL1 to SLi through the output terminal OUT thereof. Each of the 4p-th stages (i.e., SRC4) is connected to (8p−1)th and 8p-th scan lines (i.e., seventh and eighth scan lines SL7 and SL8) among the scan lines SL1 to SLi through the output terminal OUT thereof.

According to the exemplary embodiments, the (4p−3)th stages are connected to each other one after another and sequentially operated during the first period A1, and the (4p−1)th stages are connected to each other one after another and sequentially operated during the second period A2. In addition, for example, the (4p−2)th stages are connected to each other one after another and sequentially operated during the third period A3, and the 4p-th stages are connected to each other one after another and sequentially operated during the second period A4.

The control terminal CT and the carry terminal of each of the stages SRC1 to SRC4 are provided in order to connect the stages SRC1 and SRC4 to each other one after another, and the voltage input terminal Vin is provided to receive a ground voltage VSS.

As described above, the stages SRC1 to SRC4 of the scan driver 160 are divided into four sub-scan blocks, two sub-scan blocks are operated during the first sub-frame 1SF of the one frame, and remaining two sub-scan blocks are operated during the second sub-frame 2SF.

In addition, the driving order of the two sub-scan blocks operated in each of the sub-frames 1SF and 2SF may be changed every one frame.

Figure 7:
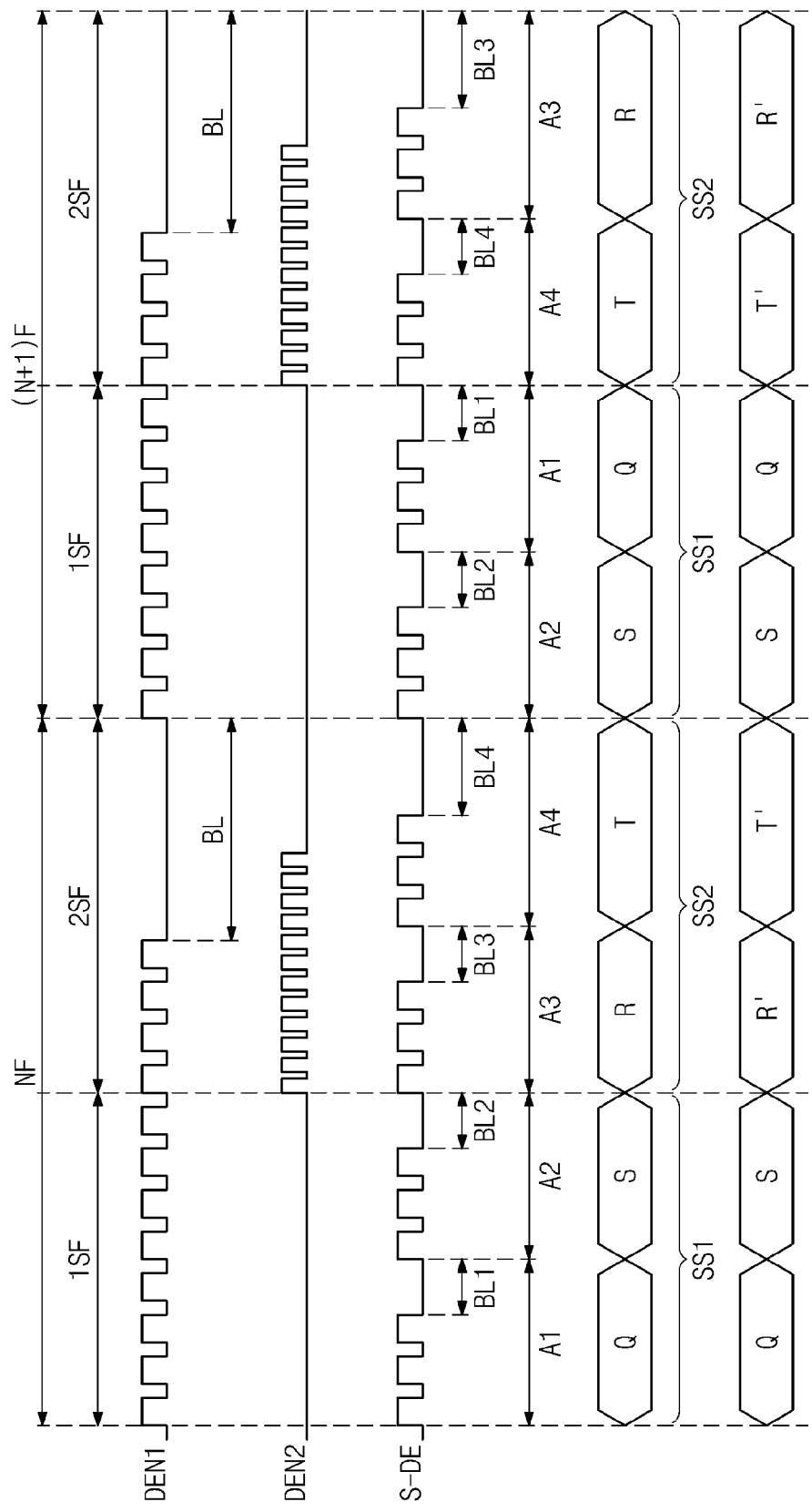
FIG. 7 is a waveform diagram showing enable timings of image data and a readout circuit.

FIG. 7 is a waveform diagram showing enable timings of image data and a readout circuit.

Referring to FIG. 7, the timing controller 130 (shown in FIG. 1) receives image data from an exterior in response to the first data enable signal DEN1. For example, the timing controller 130 receives the image data corresponding to one frame at every frame.

Then, the timing controller 130 converts the first data enable signal DEN1 into a second data enable signal DEN2 to divide the one frame into two sub-frames (i.e., first and second sub-frames 1SF and 2SF).

The second data enable signal DEN2 is maintained in a low state during the first sub-frame 1SF and has a frequency two times faster than that of the first data enable signal DEN1 during the second sub-frame 2SF.

Thus, the timing controller 130 does not provide the image data to the data driver 140 in response to the second data enable signal DEN2 during the first sub-frame 1SF. However, the data driver 140 may output again the image data of the previous frame during the first sub-frame 1SF.

Then, the timing controller 130 provides the image data to the data driver 140 in response to the second data enable signal DEN2 during the second sub-frame 2SF. Accordingly, the data driver 140 may output the image data of the present frame to the display panel 100 during the second sub-frame 2SF.

In this example, responsive to a sensor enable signal S-DE, the readout circuit 170 reads out a first sensing signal SS1 during the first sub-frame 1SF of the one frame and reads out a second sensing signal SS2 during the second sub-frame 2SF of the one frame.

As described above, the size and polarity of the data in the first sub-frame 1SF are the same as those of the data in the previous frame.

Accordingly, the control circuit 180 (shown in FIG. 1) generates a noise free sensing signal using the first sensing signal SS1 read out during the first sub-frame 1SF and the second sensing signal SS2 read out during the second sub-frame 2SF and generates a coordinate value indicating the position of the object on the display panel 100 based on the noise free sensing signal.

As shown in FIG. 7, the first sub-frame 1SF is divided into the first period A1 and the second period A2, and the second sub-frame 2SF is divided into the third period A3 and the fourth period A4.

In this example, the first sensing signal SS1 includes a first sub-sensing signal Q read out during the first period A1 and a second sub-sensing signal S read out during the second period A2. In addition, the second sensing signal SS2 includes a third sub-sensing signal R read out during the third period A3 and a fourth sub-sensing signal T read out during the fourth period A4.

As an example, the control circuit 180 subtracts the third sub-sensing signal R from the first sub-sensing signal Q to generate a first difference value and subtracts the fourth sub-sensing signal T from the second sub-sensing signal S to generate a second difference value. In addition, the control circuit 180 calculates an average value of the first and second difference values and subtracts the average value from the third and fourth sub-sensing signals R and T to generate fifth and sixth sub-sensing signals R' and T'. In this example, the control circuit 180 recognizes the average value as the noise caused by the common electrode so that the control circuit 180 subtracts the average value from the third and fourth sub-sensing signals R and T. Accordingly, the control circuit 180 may generate the coordinate value using the first sub-sensing signal Q and the second sub-sensing signal S and the fifth sensing signal R' and the sixth sub-sensing signal T'.

Meanwhile, as shown in FIG. 7, the first data enable signal DEN1 includes a blank period BL of one frame. The sensor enable signal S-DE includes first blank period BL1, second blank period BL2, third blank period BL3, and fourth blank period BL4 included in the first period A1, second period A2, third period A3, and fourth period A4.

A sum of continuation time durations of the first blank periods BL1, the second blank period BL2, the third blank period BL3 and the fourth blank period BL4 may be the same as a continuation time duration of the blank period BL of the first data enable signal DE1. In addition, the continuation time durations of the first blank period BL1, the blank period BL2, the fourth blank period BL4 may be the same as each other, but a continuation time duration of a blank period included in the last period among the four periods A1 to A4 of the one frame may be longer than the continuation time duration of each of remaining three blank period.

Figure 8:
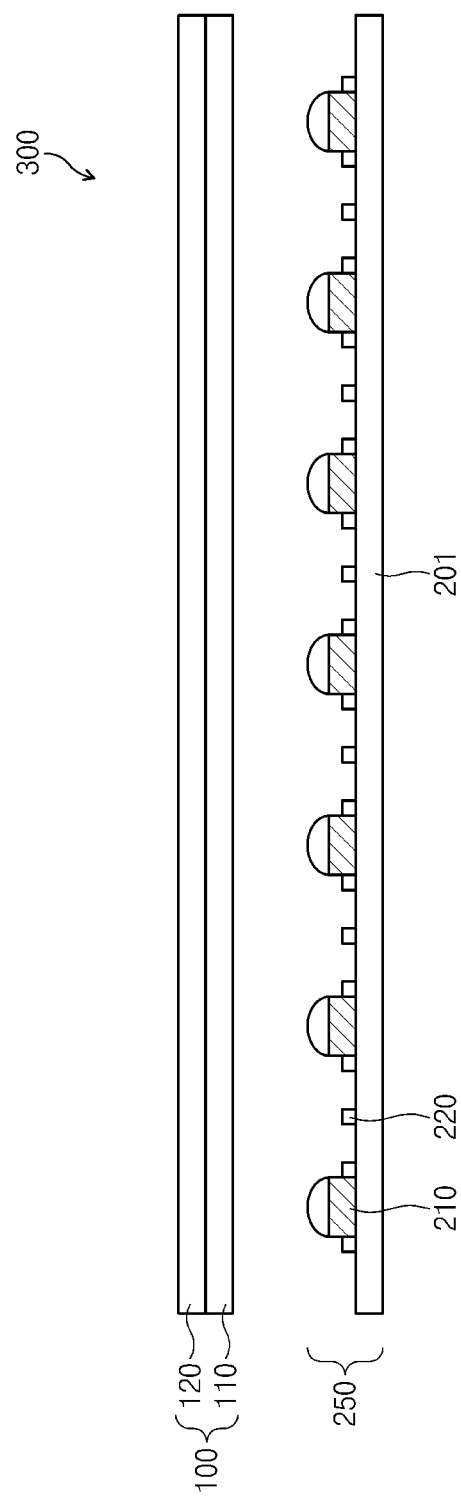
FIG. 8 is a cross-sectional view showing a display apparatus according to exemplary embodiments of the present invention.
Figure 9:
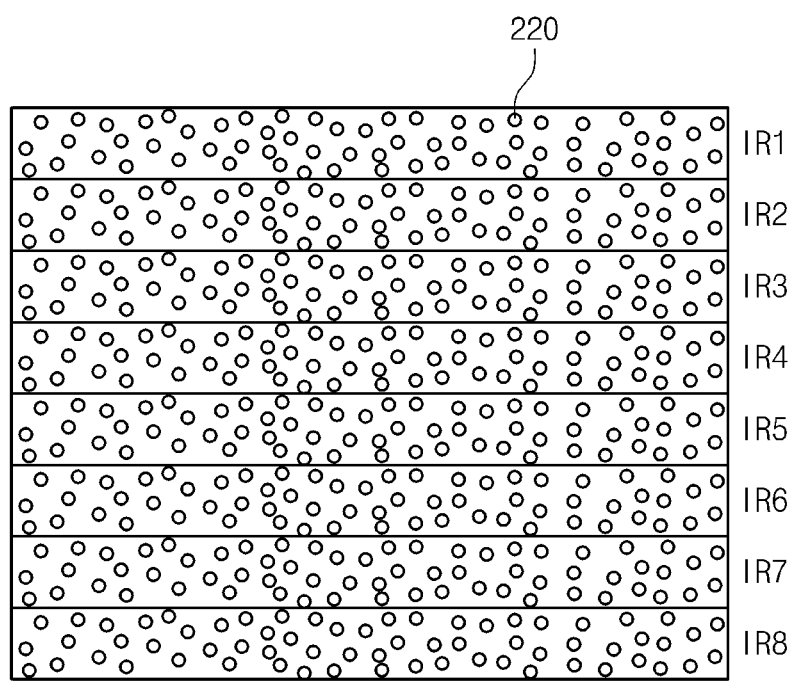
FIG. 9 is a plan view showing a backlight unit shown in FIG. 8.

FIG. 8 is a cross-sectional view showing a display apparatus according to exemplary embodiments of the present invention and FIG. 9 is a plan view showing a backlight unit shown in FIG. 8.

Referring to FIG. 8 and FIG. 9, a display apparatus 300 includes a liquid crystal display panel 100 displaying an image and a backlight unit 250 disposed under the liquid crystal display panel 100.

Since the display panel 100 has been described in detail with reference to FIGS. 1 and 3, detailed description of the display panel 100 will be omitted to avoid unnecessarily obscuring the present invention.

For example, the backlight unit 250 may include a circuit board 201 and may be disposed under the display panel 100, and a plurality of first light sources 210 may be mounted on the circuit board 201 to emit a white light, and a plurality of second light sources 220 may be mounted on the circuit board 201 to emit an infrared ray.

The first light source 210 and the second light source 220 may be alternately arranged with each other on the circuit board 201. As an example, as shown in FIG. 8, at least one of the second light sources 220 may be disposed between two adjacent first light sources 210 to each other. In addition, each of the first and second light sources 210 and 220 may include a light emitting diode.

The white light emitted from the first light sources 210 is incident into the display panel 100, and the incident white light transmits through the liquid crystal layer 129 as shown in FIG. 3. The light transmittance of the liquid crystal layer 129 is controlled by an electric field formed between the pixel electrode 115 and the common electrode 123. For example, the display panel 100 controls the transmittance of the white light by using the liquid crystal layer 129, thereby displaying an image having desired gray scale.

Meanwhile, the infrared ray emitted from the second light sources 220 is incident into the display panel 100 and transmits through the display panel 100. Since the infrared ray transmitting through the display panel 100 is not perceived by a user, the infrared ray may not have affect on the user to perceive the image displayed on the display panel 100.

The infrared ray emitted from the second light sources 220 is partially reflected by plural layers disposed in the display panel 100, and a portion of the infrared ray may transmit through the display panel 100. The infrared ray transmitting through the display panel 100 is emitted to the exterior, but the infrared ray may be reflected when the object (e.g., a finger) exists on the display panel 100.

The infrared ray reflected by the object may be detected by the first sensors SN1 disposed in the display panel 100. The infrared ray incident into the first sensors SN1 has been described in detail with reference to FIG. 1, FIG. 2, FIG. 3, FIG. 4, FIG. 5, FIG. 6 and FIG. 7, and thus details thereof will be omitted to avoid unnecessarily obscuring the present invention.

Referring to FIG. 9, for example, the second light sources 220 disposed in the backlight unit 250 may be grouped into a plurality of light emitting blocks IR1, IR2, IR3, IR4, IR5, IR6, IR7, and IR8. As an example, FIG. 9 shows the second light sources 220 that are grouped into eight light emitting blocks (hereinafter, first to eighth light emitting blocks IR1 to IR8). The first light emitting block IR1, the second light emitting block IR2, the third light emitting block IR3, the fourth light emitting block IR4, the fifth light emitting block IR5, the seventh light emitting block IR7 and the eighth light emitting block IR8 may be operated independently.

Figure 10:
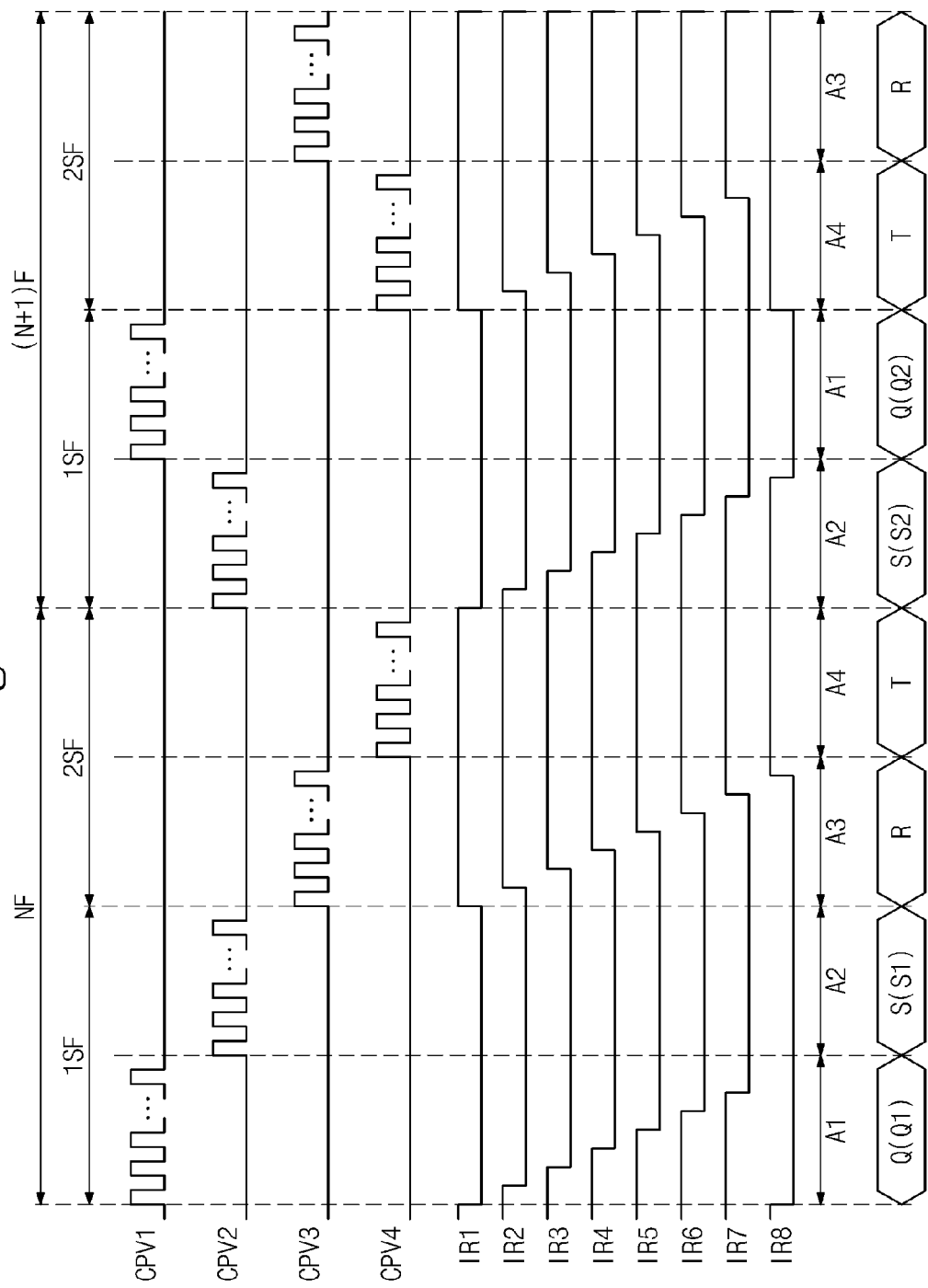
FIG. 10 is a waveform diagram showing operation timings of first light emitting block to eighth light emitting block and scanning timings of scan lines.

FIG. 10 is a waveform diagram showing operation timings of the first to eighth light emitting blocks and scanning timings of the scan lines.

Referring to FIG. 10, for example, the first light emitting block IR1, the second light emitting block IR2, the third light emitting block IR3, the fourth light emitting block IR4, the fifth light emitting block IR5, the seventh light emitting block IR7 and the eighth light emitting block IR8 are sequentially turned off at the time point at which the first sub-frame 1SF starts and sequentially turned on at the time point at which the second sub-frame 2SF starts. The continuation time duration of the turn-on period of each of the first light emitting block IR1, the second light emitting block IR2, the third light emitting block IR3, the fourth light emitting block IR4, the fifth light emitting block IR5, the seventh light emitting block IR7 and the eighth light emitting block IR8 may be the same as the continuation time duration of the first sub-frame 1SF.

The (8p−7)th and (8p−6)th scan lines of the scan lines SL1 to SLi of the display panel 100 are sequentially scanned in response to the first scan clock signal CPV1 during the first period A1 of the first sub-frame 1SF of the N-th frame NF. In addition, the (8p−3)th and (8p−2)th scan lines of the scan lines SL1 to SLi are sequentially scanned in response to the third scan clock signal CPV3 during the second period A2 of the first sub-frame 1SF of the N-th frame NF.

In addition, the (8p−5)th and (8p−4)th scan lines of the scan lines SL1 to SLi are sequentially scanned in response to the second scan clock signal CPV2 during the third period A3 of the second sub-frame 2SF of the N-th frame NF. In addition, the (8p−1)th and 8p-th scan lines of the scan lines SL1 to SLi are sequentially scanned in response to the fourth scan clock signal CPV4 during the fourth period A4 of the second sub-frame 2SF of the N-th frame NF.

After the one frame lapses, the (8p−3)th and (8p−2)th scan lines of the scan lines SL1 to SLi are sequentially scanned in response to the third scan clock signal CPV3 during the first period A1 of the first sub-frame 1SF of the (N+1)th frame (N+1)F. In addition, the (8p−7)th and (8p−6)th scan lines of the scan lines SL1 to SLi are sequentially scanned in response to the first scan clock signal CPV1 during the second period A2 of the first sub-frame 1SF of the (N+1)th frame (N+1)F.

The (8p−1)th and 8p-th scan lines of the scan lines SL1 to SLi are sequentially scanned in response to the fourth scan clock signal CPV4 during the third period A3 of the second sub-frame 2SF of the (N+1)th frame (N+1)F. In addition, the (8p−5)th and (8p−4)th scan lines of the scan lines SL1 to SLi are sequentially scanned in response to the second scan clock signal CPV2 during the fourth period A4 of the second sub-frame 2SF of the (N+1)th frame (N+1)F.

The control circuit 180 (shown in FIG. 1) generates a noise free sensing signal using the first sensing signal SS1 read out during the first sub-frame 1SF and the second sensing signal SS2 read out during the second sub-frame 2SF and generates a coordinate value indicating the position of the object on the display panel 100 based on the noise free sensing signal.

The first sensing signal SS1 includes a first sub-sensing signal Q read out during the first period A1 and a second sub-sensing signal S read out during the second period A2, and the second sensing signal SS2 includes a third sub-sensing signal R read out during the third period A3 and a fourth sub-sensing signal T read out during the fourth period A4.

The output order of the first and second sub-sensing signals Q and S is changed in every frame and also the output order of the third and fourth sub-sensing signal R and T is changed in every frame.

For the purpose of explanation, it is assumed that the first sub-sensing signal emitted during the N-th frame is referred to as 'Q1' and the first sub-sensing signal emitted during the (N+1)th frame (N+1)F is referred to as 'Q2', two periods A3 and A4, during which the second light sources 220 are turned on, exist between the Q1 and Q2. The external light is continuously provided during the two periods between the Q1 and Q2. In the present exemplary embodiment, there is five-period difference between the Q1 and Q2.

Accordingly, the Q2 is represented by the following Equation 1.

$$Q2 = 2IR + 5amb \qquad \text{Equation 1}$$

In Equation 1, IR denotes the sensing value by the infrared ray and amb denotes the sensing value by the external light.

Meanwhile, when the second sub-sensing signal emitted during the N-th frame NF is referred to as 'S1' and the second sub-sensing signal emitted during the (N+1)th frame (N+1)F is referred to as 'S2,' two periods A3 and A4, during which the second light sources 220 are turned on, exist between the S1 and S2. The external light is continuously provided during the two periods between the S1 and S2. In the present exemplary embodiment, there is three-period period difference between the S1 and S2.

Accordingly, the S2 is represented by the following Equation 2.

$$S2 = 21R + 3amb \quad \text{Equation 2}$$

The sensing value (amb) about the external light may be calculated by using Equation 1 and Equation 2. The sensing value (amb) about the external light is represented by the following Equation 3.

$$amb = (Q2 - S2)/2 \quad \text{Equation 3}$$

For example, when the sensing value amb by the external light is calculated, the control circuit 180 subtracts the sensing value amb from the Q2 and S2 to generate the sensing signal that is free from the external light noises.

Thus, the control circuit 180 may generate the coordinate value indicating the position of the object on the display panel 100 using the sensing signal that is free from the external light noises.

Figure 11:
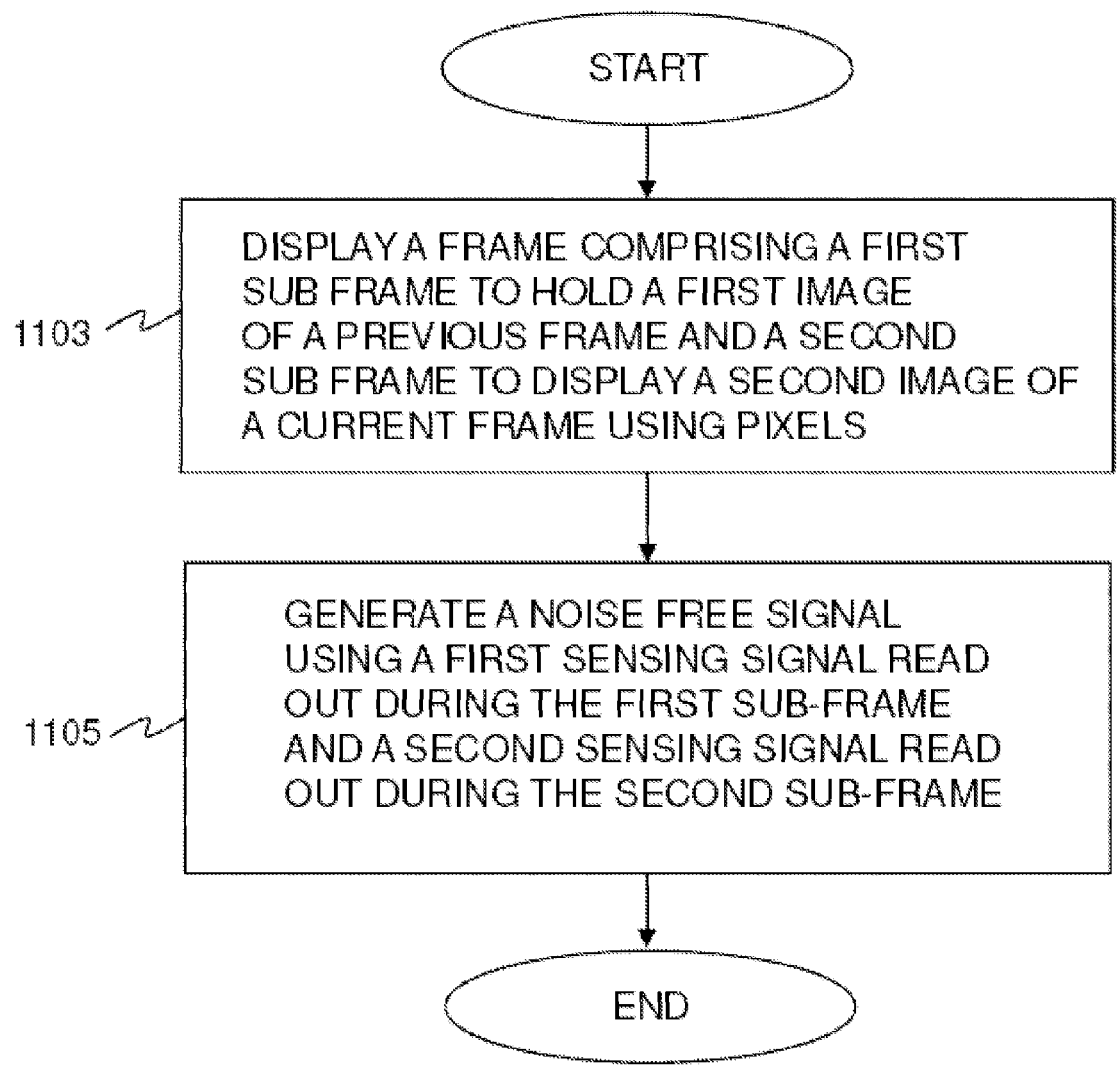
FIG. 11 is a flowchart of a process for providing a display apparatus capable of generating a noise free signal according to exemplary embodiments of the present invention.

FIG. 11 is a flowchart of process for providing a display apparatus capable of generating a noise free signal according to exemplary embodiments of the present invention.

As described, for example, as in step 1103, displaying a frame comprising a first sub frame to hold a first image of a previous frame and a second frame to display a second image of a current frame using pixels of a display. Sensing signals are divided into a first sensing signal read out during a first sub-frame and a second sensing signal read out during a second sub-frame, and a control circuit generates a noise free signal using the first and second sensing signals. In step 1105, generating a noise free signal using a first sensing signal read out during the first sub-frame and a second sensing signal read out during the second sub-frame. As such, a coordinate value indicating the position of the object may be generated based on the noise free signal, thereby preventing mis-operation or malfunction caused by the noise.

One of ordinary skill in the art would recognize that processes for generating a noise free signal may be implemented via software, hardware (e.g., general processor (e.g., controller), Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 12.

Figure 12:
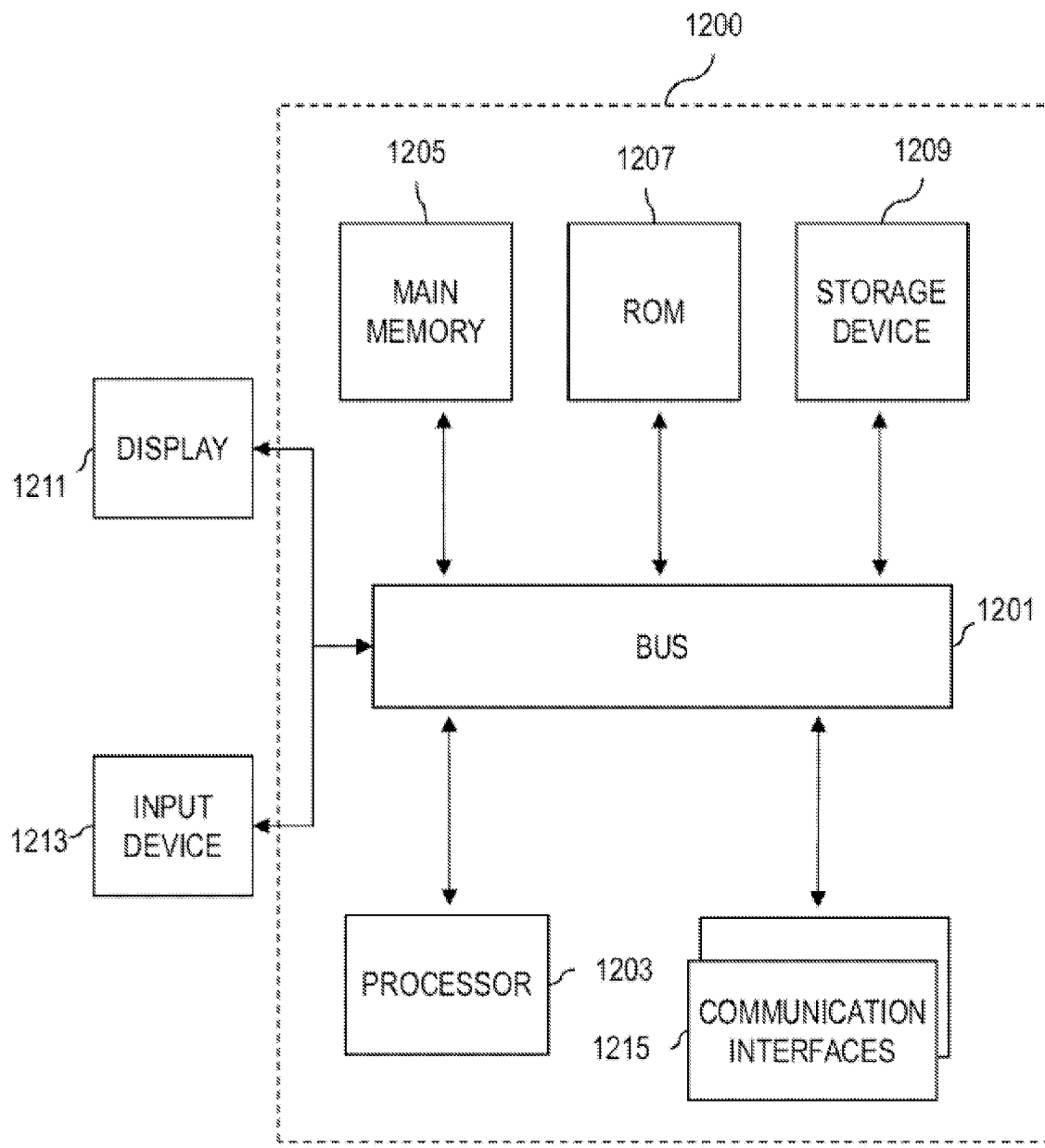
FIG. 12 is a diagram of hardware that can be used to implement various embodiments of the invention.

FIG. 12 illustrates exemplary hardware upon which various embodiments of the invention can be implemented. A computing system 1200 includes a bus 1201 or other communication mechanism for communicating information and a processor 1203 (e.g., a controller) coupled to the bus 1201 for processing information. The computing system 1200 also includes main memory 1205, such as a random access memory (RAM) or other dynamic storage device, coupled to the bus 1201 for storing information and instructions to be executed by the processor 1203. Main memory 1205 can also be used for storing temporary variables or other intermediate information during execution of instructions by the processor 1203. The computing system 1200 may further include a read only memory (ROM) 1207 or other static storage device coupled to the bus 1201 for storing static information and instructions for the processor 1203. A storage device 1209, such as a magnetic disk or optical disk, is coupled to the bus 1201 for persistently storing information and instructions.

The computing system 1200 may be coupled with the bus 1201 to a display 1211, such as a liquid crystal display, or active matrix display, for displaying information to a user. An input device 1213, such as a keyboard including alphanumeric and other keys, may be coupled to the bus 1201 for communicating information and command selections to the processor 1203. The input device 1213 can include a cursor control, such as a mouse, a trackball, or cursor direction keys, for communicating direction information and command selections to the processor 1203 and for controlling cursor movement on the display 1211.

According to various embodiments of the invention, the processes described herein can be provided by the computing system 1200 in response to the processor 1203 executing an arrangement of instructions contained in main memory 1205. Such instructions can be read into main memory 1205 from another computer-readable medium, such as the storage device 1209. Execution of the arrangement of instructions contained in main memory 1205 causes the processor 1203 to perform the process steps described herein. One or more processors in a multi-processing arrangement may also be employed to execute the instructions contained in main memory 1205. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 1200 also includes at least one communication interface 1215 coupled to bus 1201. The communication interface 1215 provides a two-way data communication coupling to a network link (not shown). The communication interface 1215 sends and receives electrical, electromagnetic, or optical signals that carry digital data streams representing various types of information. Further, the communication interface 1215 can include peripheral interface devices, such as a Universal Serial Bus (USB) interface, a PCMCIA (Personal Computer Memory Card International Association) interface, etc.

The processor 1203 may execute the transmitted code while being received and/or store the code in the storage device 1209, or other non-volatile storage for later execution. In this manner, the computing system 1200 may obtain application code in the form of a carrier wave.

The term "computer-readable medium" as used herein refers to any medium that participates in providing instructions to the processor 1203 for execution. Such a medium may take many forms, including but not limited to non-volatile media, volatile media, and transmission media. Non-volatile media include, for example, optical or magnetic disks, such as the storage device 1209. Volatile media include dynamic memory, such as main memory 1205. Transmission media include coaxial cables, copper wire and fiber optics, including the wires that comprise the bus 1201. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display apparatus comprising:
  a display panel comprising a plurality of pixels to display a first image and a second image, during a first frame and a second frame, each of the first and second frames includes a first sub-frame and a second sub-frame,
  wherein the display panel is configured to receive a first data voltage during the first sub-frame of the second frame to hold the first image, and to receive a second data voltage during the second sub-frame of the second frame to display the second image, and the first data voltage is a voltage that is received during the second sub-frame of the first frame to display the first image;
  a plurality of sensors configured to detect a touch event on the display panel and to output sensing signals;
  a scan driver comprising a plurality of stages to output a plurality of scan signals to switch the sensors, the scan driver configured to drive a first scan block among the output stages during the first sub-frame and to drive a second scan block among the stages during the second sub-frame;
  a readout circuit configured to read out the output sensing signals; and
  a control circuit configured to generate a noise free signal using a first sensing signal read out during the first sub-frame and a second sensing signal read out during the second sub-frame and to generate a coordinate value to indicate the position of an object on the display panel based on the noise free signal.

2. The display apparatus of claim 1, wherein the first sub-frame comprises successive first period and second period, the first scan block comprises first sub-scan block and second sub-scan block operated during the first period and the second period, respectively, the second sub-frame comprises successive third period and fourth period, and the second scan block comprises third sub-scan block and fourth sub-scan block operated during the third period and the fourth period, respectively.

3. The display apparatus of claim 2, wherein the first sub-scan block comprises (4p−3)th stages among the stages, the second sub-scan block comprises (4p−1)th stages among the stages, the third sub-scan block comprises (4p−2)th stages among the stages, and the fourth sub-scan block comprises 4p-th stages, where the p is a natural number equal to or greater than 1.

4. The display apparatus of claim 3, wherein the display panel further comprises a plurality of scan lines to connect the sensors and the scan driver, each of the (4p−3)th stages is connected to (8p−7)th and (8p−6)th scan lines, each of the (4p−2)th stages is connected to (8p−5)th and (8p−4)th scan lines, each of the (4p−1)th stages is connected to (8p−3)th and (8p−2)th scan lines, and each of the 4p-th stages is connected to (8p−1)th and 8p-th scan lines.

5. The display apparatus of claim 3, wherein the scan driver is configured to receive first scan clock signal, second scan clock signal, third scan clock signal, and fourth scan clock signal, the (4p−3)th stages are sequentially operated in response to the first scan clock signal, the (4p−2)th stages are sequentially operated in response to the second scan clock signal, the (4p−1)th stages are sequentially operated in response to the third scan clock signal, and the 4p-th stages are sequentially operated in response to the fourth scan clock signal.

6. The display apparatus of claim 5, wherein the first scan clock signal, the second scan clock signal, the third scan clock signal, and the fourth scan clock signal are generated in an order of the first scan clock signal, the third scan clock signal, the second scan clock signal, and the fourth scan clock signal during an N-th frame, and the first scan clock signal, the second scan clock signal, the third scan clock signal, and the fourth scan clock signal are generated in an order of the third scan clock signal, the first scan clock signal, the fourth scan clock signal, and the second scan clock signal during an (N+1)th frame.

7. The display apparatus of claim 2, wherein the first sensing signal comprises a first sub-sensing signal read out during the first period and a second sub-sensing signal read out during the second period, and the second sensing signal comprises a third sub-sensing signal read out during the third period and a fourth sub-sensing signal read out during the fourth sub-sensing signal.

8. The display apparatus of claim 7, wherein the control circuit is configured to subtract the third sub-sensing signal from the first sub-sensing signal to generate a first difference value, to subtract the fourth sub-sensing signal from the second sub-sensing signal to generate a second difference value, and to generate the noise free signal using the first and second difference values.

9. The display apparatus of claim 8, wherein the control circuit is configured to calculate an average value of the first difference value and the second difference value, to subtract the average value from the third sub-sensing signal and the fourth sub-sensing signal to generate fifth sub-sensing signal and sixth sub-sensing signal, and to use the first sub-sensing signal, the second sub-sensing signal, the fifth sub-sensing signal, and the sixth sub-sensing signal as the noise free signal.

10. The display apparatus of claim 1, wherein the display panel comprises
  a first substrate comprising a plurality of pixels arranged in a matrix shape; and a second substrate comprising a plurality of sensors arranged in a matrix shape to be coupled with the first substrate and facing the first substrate.

11. The display apparatus of claim 10, wherein the sensors comprise a plurality of first sensors to detect an infrared ray and a plurality of second sensors to detect a visible ray, and the first sensors are alternately arranged with the second sensors in a row or column direction.

12. The display apparatus of claim 11, further comprising:
a backlight unit comprising a plurality of first light sources to emit a white light and a plurality of second light sources to emit the infrared ray, wherein the first light sources and the second light sources are disposed at a rear side of the first substrate.

13. The display apparatus of claim 12, wherein the second light sources are grouped into a plurality of light emitting blocks, and the light emitting blocks are sequentially turned off at a time point at which the first sub-frame starts and sequentially turned on at a time point at which the second sub-frame starts.

14. The display apparatus of claim 13, wherein a continuation time duration of the turned-on period of each of the light emitting blocks is equal to a continuation time duration of the first sub-frame.

15. The display apparatus of claim 13, wherein the first sub-frame comprises successive first period and second period, the first scan block comprises first sub-scan block and second sub-scan block operated during the first period and the second period, respectively, the second sub-frame comprises successive third period and fourth period, and the second scan block comprises third sub-scan block and fourth sub-scan block operated during the third period and the fourth period, respectively.

16. The display apparatus of claim 15, wherein an output order of the first sub-sensing signal and the second sub-sensing signal is changed in every frame and an output order of the third sub-sensing signal and the fourth sub-sensing signal is changed in every frame.

17. The display apparatus of claim 16, wherein the first sensing signal comprises a first sub-sensing signal read out during the first period and a second sub-sensing signal read out during the second period, and the second sensing signal comprises a third sub-sensing signal read out during the third period and a fourth sub-sensing signal read out during the fourth sub-sensing signal.

18. The display apparatus of claim 17, wherein the control circuit is configured to subtract the first sub-sensing signal from the second sub-sensing signal to calculate a sensing value by an external light and to subtract the sensing value by the external light from the first sub-sensing signal and the second sub-sensing signal to generate the noise free signal.

19. The display apparatus of claim 1, further comprising:
a timing controller configured to receive an image data in synchronization with a first data enable signal and to output the image data in synchronization with a second data enable signal;
a data driver configured to receive the image data from the timing controller to output the data voltages to the display panel; and
a gate driver configured sequentially to output a gate voltage to the display panel.

20. The display apparatus of claim 19, wherein the second data enable signal is maintained in a low state during the first sub-frame and has a frequency two times faster than a frequency of the first data enable signal during the second sub-frame.

21. An apparatus comprising:
a display panel comprising a pixel to display a first image and a second image during a first frame and a second frame, each of the first and second frames includes a first sub-frame and a second sub-frame,
wherein the display panel is configured to receive a first data voltage during the first sub-frame of the second frame to hold the first image, and to receive a second data voltage during the second sub-frame of the second frame to display the second image, and the first data voltage is a voltage that is received during the second sub-frame of the first frame to display the first image;
a sensor configured to sequentially output a series of sensing signals in response to detection of an object; and
a controller configured to generate a noise free signal using a first sensing signal read out during the first sub-frame and a second sensing signal read out during the second sub-frame.

22. The apparatus of claim 21, wherein the controller is configured to generate a coordinate value using the noise free signal.

23. A method comprising:
displaying a first image and a second image during a first frame and a second frame, each of the first and second frames includes a first sub-frame and a second sub-frame;
receiving a first data voltage during the first sub-frame of the second frame for holding the first image;
receiving a second data voltage during the second sub-frame of the second frame for displaying the second image; and
generating a noise free signal using a first sensing signal read out during the first sub-frame and a second sensing signal read out during the second sub-frame,
wherein the first data voltage is a voltage that is received during the second sub-frame of the first frame for displaying the first image, and
wherein a plurality of sensors are arranged to sequentially output a series of sensing signals in response to detection of an object.

* * * * *